United States Patent [19]

Haiss

[11] 4,290,526

[45] Sep. 22, 1981

[54] PACKAGE, ESPECIALLY TUBULAR WRAPPER-TYPE CONTAINER WITH RE-USABLE CLOSURE, ESPECIALLY FOR CHOCOLATES OR CANDY

[76] Inventor: Manfred Haiss, Zeisigweg 17, 7035 Waldenbuch, Fed. Rep. of Germany

[21] Appl. No.: 76,068

[22] Filed: Sep. 17, 1979

[30] Foreign Application Priority Data

Sep. 16, 1979 [DE] Fed. Rep. of Germany ....... 2840409

[51] Int. Cl.³ .......................... B65D 5/54; B65D 17/28
[52] U.S. Cl. ..................................... 206/624; 206/491; 206/525; 426/119
[58] Field of Search ............... 206/525, 611, 624, 621, 206/634, 491.1; 426/119

[56] References Cited

U.S. PATENT DOCUMENTS

| | | | |
|---|---|---|---|
| 2,242,694 | 5/1941 | Booth | 206/611 |
| 3,162,539 | 12/1964 | Repko | 426/119 |
| 3,327,923 | 6/1967 | Baughan | 206/491.1 |
| 3,486,682 | 12/1969 | Mahon et al. | 206/491.1 |
| 3,599,858 | 8/1971 | Samsing | 206/491.1 |

Primary Examiner—William T. Dixson, Jr.
Attorney, Agent, or Firm—Becker & Becker, Inc.

[57] ABSTRACT

A package, especially tubular wrapper-type container for ice cream bars, candy bars, chocolate, and the like wares, is disclosed. The package includes at at least one end thereof a section extending around the package towards the seal seam thereof, which section is adapted to break or tear to open the package and expose the contents thereof.

15 Claims, 6 Drawing Figures

PACKAGE, ESPECIALLY TUBULAR WRAPPER-TYPE CONTAINER WITH RE-USABLE CLOSURE, ESPECIALLY FOR CHOCOLATES OR CANDY

The present invention relates to a package, especially tubular wrapper-type container, having at least one re-usable or closable end, particularly for bar-type chocolates, ice cream, and similar products.

It is known to market chocolate-type nourishments in tubular wrapper-type packages or containers. Such packages are simple, economical, and can be produced with high efficiency, i.e. at 500 cycles per minute, or more. These packages are furthermore easily transported since they do not require a great amount of space.

However, the known containers or wrappers are difficult to open and usually are not adapted to be reclosed, or when they can be reclosed, this will not be easy once the package or container has been opened. Quite frequently the seam of these packages is damaged when the packages are opened, which means that it will not be possible to avoid touching the contents thereof.

It is, accordingly, an object of the present invention to provide a package or container, especially tubular package for ice cream bars, candy bars, chocolate, and the like wares, which is adapted to be opened and closed without touching of the contents therein.

This object and other objects and advantages of the invention will appear more clearly from the following specification in connection with the accompanying drawings, in which:

FIG. 3 is a cross section along line III—III of FIG. 1a;

The tubular package according to the present invention is characterized primarily therein that at least at one end thereof there is provided a section extending around the package towards both sides of the seam of the package; this section is adapted to break and to open the package and expose the contents thereof. The section is preferably arranged in a single plane. This section of the package can have a V-shaped configuration, when viewed in plan, on one side of the package.

The seal seam of the package can be formed by two projecting edges joined to one another.

In accordance with a preferred embodiment of the invention, the package extends beyond one end of the contents to be arranged therein and this end is compressed to form a flap.

In accordance with yet another preferred embodiment of the invention the location of the section at which the package can be opened is visible on the outer side of the container.

The material of construction of the package can be a foil-type material, i.e. a multi-combination foil, or a mono-foil. Such foils can be polyvinylchloride (PVC), synthetic glass and/or aluminum paper, polypropylene or polyethylene.

In accordance with yet another preferred embodiment of the invention, the section is provided with hot sealing lacquers, dispersions, paraffins, or synthetic material containing waxes.

Figure 1:
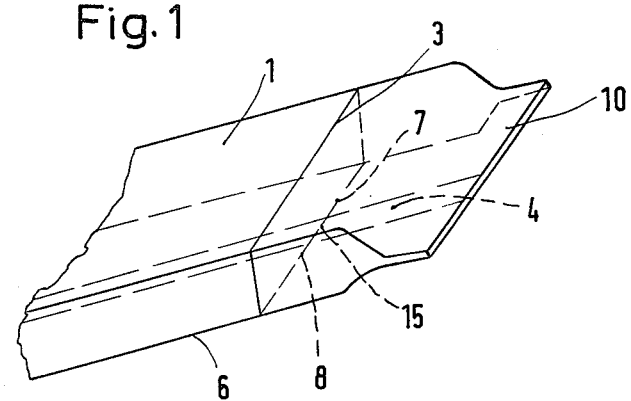
FIG. 1 is a perspective view indicating an end of a tubular package in accordance with one embodiment of the invention.

Referring now particularly to the drawings, a tubular wrapper or package 1 of generally rectangular cross section is shown which is particularly adapted to be used with chocolate bars or chocolate-type wares or similar items. The wrapper, however, can also be used with paste-like contents or products which easily melt, for example, ice cream, and with all other products which are to be consumed piece by piece, i.e. chocolate which is dispensed in bars connected along strips of weakened material. Near the end which is shown in the drawings, the package or the wrapper 1 is provided with a section 3 which has a tearable reduction of wall thickness, the section 3 extending at an angle to the seal seam 4. Seam 4 is formed along the projecting strips of the wrapper 1 which are joined to one another by this seam 4 and generally designated by the reference numeral 5 (FIG. 3). For ease of representation, the seal seam 4 is indicated in FIGS. 1a to 3, respectively, perpendicular to the side 6 belonging therewith; generally, the seam itself is directly on the side 6 (FIG. 1).

The section 3 near the one end of the wrapper 1 extends perpendicular to the seal seam 4 which, in turn, is arranged to extend over the full length of package 1. As indicated in FIG. 1, the section 3 extends close to the seal seam 4 and the two ends 7 and 8 of the section 3 terminate a short distance away from this seam 4. In the embodiment according to FIGS. 1 to 3, section 3 extends in a plane perpendicular to the longitudinal axis of the seal seam 4.

Figure 2:
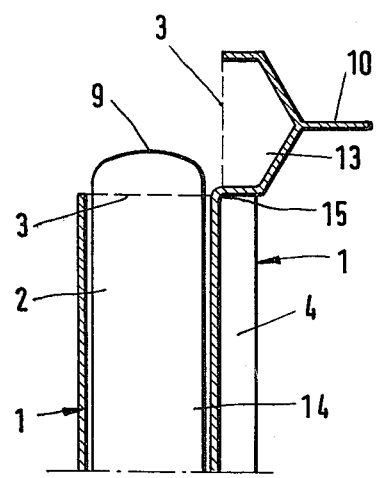
FIG. 2 is a view according to FIG. 1a which indicates opening of the tubular package.
Figure 1A:
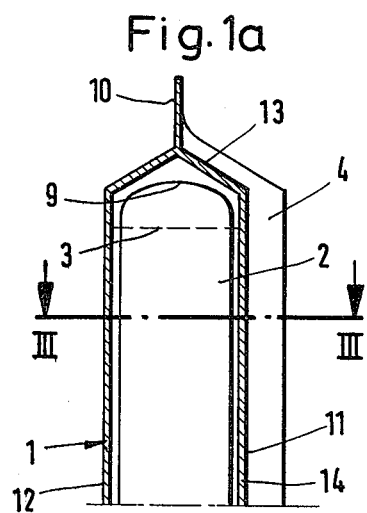
FIG. 1a is a side elevational view, drawn to a larger scale, of a vertical cross section of the package according to FIG. 1.
Figure 3:
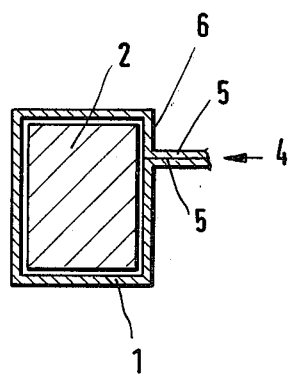

The package 1 is opened along the section 3 (FIG. 2). To provide for easy opening of the package 1, a portion 10 thereof extends beyond the end 9 of the particular item 2 in the package. The portion 10 is formed as a flap or tongue which is formed by the compressed ends of the sides 11 and 12 which, as indicated, are pressed together to form the flap or tongue portion 10, while otherwise being brought around the item 2 in the package 1 as will be expedient therefor. For opening of the package 1, the flap or tongue 10 is pulled, whereby the package tears along the section 3. The section 3 is preferably arranged in such a way that, opening of the wrapper 1, the item 2 extends above the remaining edge so that item 2 can be removed with ease from the package (FIG. 2).

The tearable reduction of wall or section 3 is not fully continuous, so that the severed portion 13 of the package is not fully separated from the other portion 14, which provides the advantage that the package, after removal of an item, can be reclosed.

The section of the seal seam 4 between the ends 7 and 8 of the section 3 serves as a hinge 15 which connects the portions 13 and 14. Upon opening and closing of the package, the portion 13 is pivoted about the axis of this hinge 15 relative to the other portion 14. This hinge 15 provides for a particularly easy opening and closing of the package. Since the seal seam 4, due to the superimposed edges or strips 5, is provided by a double layer of material, the package can be opened and closed repeatedly, without the danger arising that the seal seam 4 will break in the region between the ends 7 and 8 of the section 3, which could lead to a full separation of the portions 13 and 14.

Usually the items which are packaged in this way are moved, for piecemeal consumption, in the package in the direction towards the open end thereof. Should a simple movement of the item 2 in the package not be easily possible, an additional tearable reduction of wall can be provided at the other end of the package 1. Advantageously, the section is then has a configuration as indicated in FIGS. 1 to 3. Independent of the ease of movement of the item in package 1, of course, at both ends thereof there can be, respectively, provided a section, so that the package can be selectively opened at both ends.

In the embodiment according to FIGS. 1 to 3, the section or tearable reduction of wall 3 extends in a plane perpendicular to the longitudinal axis of the seam 4. Such an arrangement of section 3 is preferred for reasons of manufacturing techniques. For ease of handling or opening, for easier consumption and for reasons of appearance, the section 3 can also be of other different configurations.

Figure 4:
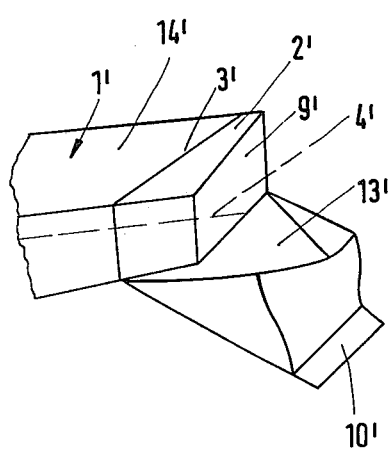
FIG. 4 is a perspective view indicating a further embodiment of a package in accordance with the invention, with one end thereof shown in open position.

In the embodiment according to FIG. 4, the section 3' is arranged in one plane and transverse to the seam 4'. In plan view, the package 1' has a section 3' which extends at an acute angle to the longitudinal axis of the seal seam 4'. Thus, when the package is opened, the section 3' on one side of the wrapper is at a smaller distance from the end 9' of the item 2' than on the opposite side, so that the multi-wrapped item can be easily taken at the section which projects further from the portion 14' for removal of the item 2' from the package. Again in this embodiment, the two ends of the section 3' (not shown) are located at a short distance away from the seal seam 4', so that, upon opening of the package, the movable upper portion 13' is not completely separated from the lower portion 14'. In accordance with the afore-described embodiment also near the other end, not shown, of package 1' there can be provided a further section which may extend parallel to the section 3' or as mirror image thereof.

Figure 5:
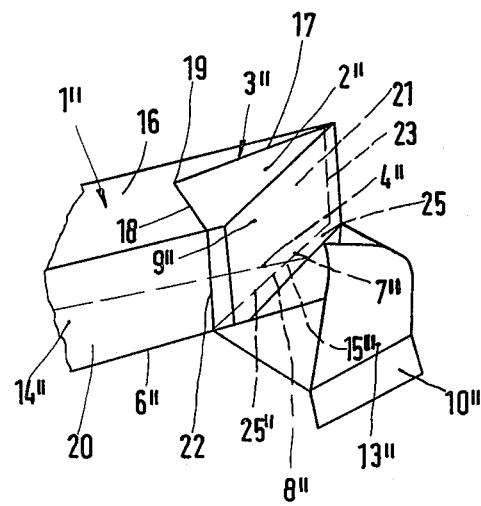
FIG. 5 is a perspective view of yet another embodiment of a package in accordance with the present invention, also with one end shown in open position.

In the embodiment according to FIG. 5, the section 3" extends in V-shaped outline on side 16 of the package 1". The V-shape, comprised of two sections 17 and 18, can have an acute angle, obtuse angle, or right angle. In the direction of the pertaining end of the wrapper 1" they can diverge away from one another. The apex of the V, designated by the numeral 19, of the section is preferably arranged, when seen in plan view, to be above and coincidental with the seal seam 4" on the side designated by the numeral 16. The two sections 17 and 18 of the section 3" are arranged to extend also along the narrow sides 20 and 21 of the wrapper 1". The sections 22 and 23, respectively, of the section along these narrow sides and the sections 25 and 25" which are located on the side 6", i.e. on the side opposite to side 16, are arranged in a plane which extends perpendicular to the longitudinal axis of the seal seam 4".

The two ends 7" and 8" of the tearable reduction of wall or section 3" are arranged at a short distance away from seal seam 4"-in such a way that this seam 4" provides a hinge 15" in the vicinity between these two ends so that the portions 13" and 14" are connected by means of the hinge 15" in such a way that at least the portion 13" is movable through an arc, or pivotable or similarly movable, in relation to portion 14". Furthermore, due to the V-shaped configuration of the section 3" on side 16 of the package 1", the package is adapted to be near to item 2" which is to be packaged or enclosed, with the two narrow sides 20 and 21 and the side 6" being almost adjacent and in contact with the end 9" of the item 2", so that the item, after opening or using of the package, is optimally protected while, on the other hand, is easily reached.

The sections can have various other forms in addition to those which have been described. Generally, they should comprise such geometrical shapes which will improve the handling or consumption of the item in the package, or which will enhance the appearance of the package.

The packages 1, 1' and 1" are solely opened by pulling on the pertaining tongue 10, 10' and 10" in a direction inclined to the end 9, 9' and 9" of the item enclosed therewith, in the direction of the seal seam 4, 4' and 4", along the respective section 3, 3' and 3". The portion 13, 13' and 13" of a pertaining package, after opening thereof, provides a receiving pocket into which any spilled material can drop. This will provide the advantage that the package can be opened in cars or similar vehicles, without the danger of soiling the seat upholstery. In the aforementioned embodiments, the items which are wrapped or covered by the package are securely stored and the package can be opened and closed as desired at any time.

In order to bring the tearable reduction of wall or section to the immediate attention of a customer, the section can be identified on the outside of the package. It is contemplated in some embodiments to use a multi-combination foil-type material, which comprises several layers of foils of varying materials. Again, it is possible that a single layer foil is used for producing the package in accordance with the present invention. In any event, the package can be opened along the tearable reduction of wall in an effective and positive manner. The foil can comprise polyvinylchloride (PVC), synthetic glass- and/or aluminum-paper, polypropylene, or polyethylene. In such materials the tearable reduction of wall can be arranged in such a way that the package is opened neatly along the tearable reduction of wall.

In order to enclose the items in an hermetically sealed manner, the sections 3, 3' and 3" can be provided with lacquers having hot sealing properties, dispersions, paraffins, or synthetics-containing waxes.

The wrapper in accordance with the present invention can be opened neatly and easily along the tearable reduction of wall, so that accidental touching or contact with the item to be wrapped or covered is prevented. Since the tearable reduction of wall package is opened remains connected to the main body so that the package can be closed again. The portion of the seal seam near the adjacent ends of the tearable reduction of wall is thus adapted to act as a hinge, with the opened end of the wrapper being adapted to be swung to the open position or to the closed position.

The present invention is, of course, in no way restricted to the specific disclosure of the specification and drawings, but also encompasses any modifications within the scope of the appended claims.

What I claim is:

1. A package, especially tubular package for ice cream bars, candy bars, chocolate, and similar products including meltable articles such as ice, said package comprising in combination:
    a substantially continuous body having a first end and a second end and a seal seam suitably located with said body;

at least at one end portion of said package including a tear-weakened section thereof extending around said package towards both sides of said seam and being adapted to break and to open said package at said last one end portion so as to expose only a part of the contents of said package protected against direct touching engagement with the contents thereof;

a hinge formed by a portion of said package extending over only part of periphery of the package for opening and closing thereof; and a tongue pullable to apply transverse force that effects tearing of said tear-weakened section adjacent thereto.

2. A package in combination according to claim 1, wherein said tear-weakened section lies in a single plane.

3. A package in combination according to claim 1, wherein said tear-weakened section extends V-shaped, when viewed in plan, on one side of said package body.

4. A package in combination according to claim 1, wherein the wall of said package has overlapping and outwardly projecting longitudinal edges joined to one another to form said seam.

5. A package in combination according to claim 1, wherein the effective length of said package is greater than the length of the respective item to be contained therein, with the extension being adapted to be pressed together.

6. A package in combination according to claim 1, wherein said tear-weakened section is visible on the outside of said package by being provided with visual indicia.

7. A package in combination according to claim 1, wherein said package is made of a foil material.

8. A package in combination according to claim 7, wherein said foil material is a mono-foil material.

9. A package in combination according to claim 7, wherein said foil material is a multi-combination foil material.

10. A package in combination according to claim 7, wherein said foil material includes at least one material selected from the group including polyvinylchloride, cellulose glass paper (Zellglas-Papier), aluminum paper, polypropylene, polyethylene.

11. A package in combination according to claim 1, wherein said section is provided with hot sealable lacquers, dispersions, paraffins and synthetic material-containing waxes.

12. A package in combination according to claim 1, wherein said tear-weakened section ends at least at said seam.

13. A package in combination according to claim 1, wherein said package is re-closeable by said at least one end.

14. A package in combination according to claim 1, wherein said tear-weakened section extends at an angle transverse to said seam.

15. A tubular-bag package of foil material for edible packaged material including chocolate, candy bars, ice cream bars and similar products including meltable articles such as ice and the like, said package with a face side thereof comprising in combination:

a substantially continuous body defining a periphery of the package as well as having a first end and a second end;

at least one seal seam suitably located with said body;

at least one tear-weakened portion which extends only over a portion of the periphery of the package;

a hinge formed by a portion of the package whereby said tear-weakened portion lies in a region above the packaged material; and a releasing part for tearing open the tear-weakened portion connected therewith in such a manner that by application of pulling force on said releasing part transverse to said tear-weakened portion and at an incline to the face side of the package belonging therewith said tear-weakened portion is opened.

* * * * *